Figure 1:
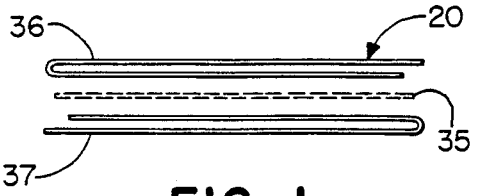
Figure 8:
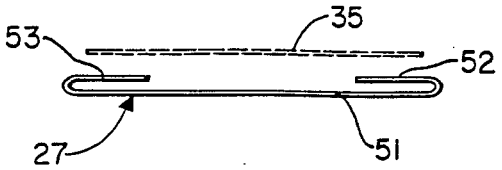
Figure 2:
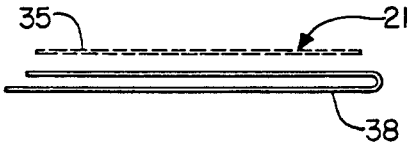
Figure 9:
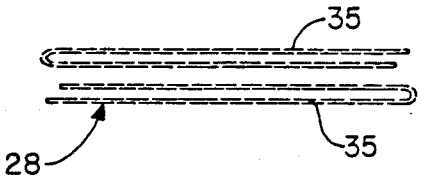
Figure 3:
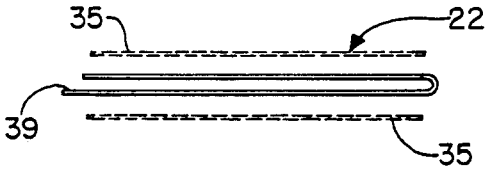
Figure 10:
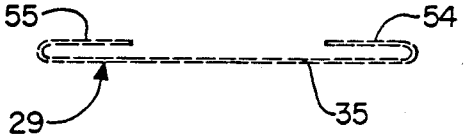
Figure 4:
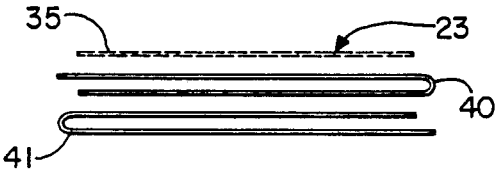
Figure 11:
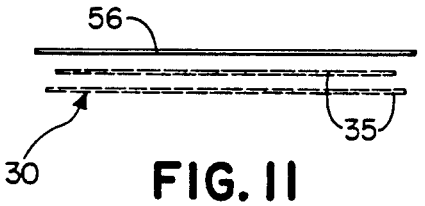
Figure 5:
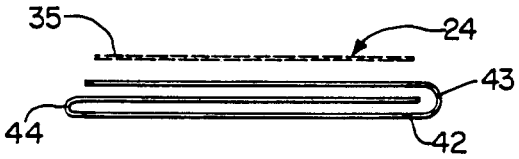
Figure 12:
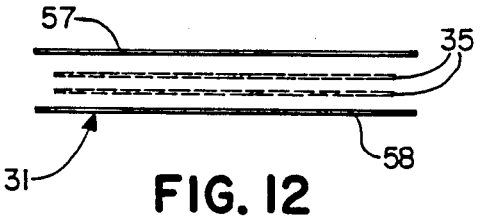
Figure 6:
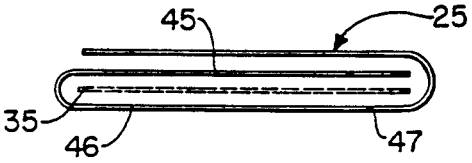
Figure 7:
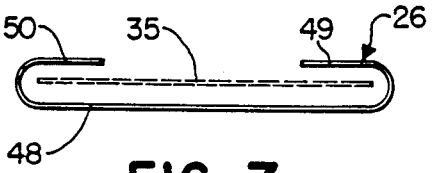
Figure 13:
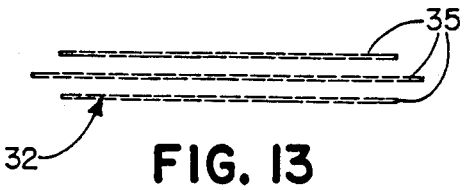

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 75

T943,005
METHOD OF BUILDING A RADIAL TIRE

John D. Smithkey, Jr., 1271 Overland Ave. NE., North Canton, Ohio 44720

Filed Aug. 14, 1974, Ser. No. 497,544
Int. Cl. B29h *17/14*
U.S. Cl. 156—123
1 Sheet Drawing. 5 Pages of Specification

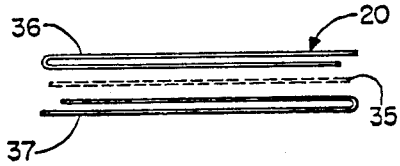

A method of building a radial tire by the flat band method normally employed in the construction of bias and bias-belted tires. The radial tire is provided with a belt structure having at least one belt ply reinforced with cords which (I) have a high modulus of elasticity of at least 220 grams per denier, and (II) are disposed at angles in the range of from 16 to 32 degrees measured in relation to a plane containing the mid-circumferential centerline of the tread of the tire when molded, vulcanized and uninflated. The belt plies with high modulus cords of, for example, steel, glass, or aramid, are represented in dotted line in the drawing. The belt plies, other than those with high modulus cords, are reinforced with cords having a lower modulus of elasticity not exceeding 200 grams per denier. The belt plies with the lower modulus cords of, for example, rayon, nylon, or polyester, are represented in full, solid line in the drawings.

Feb. 3, 1976 J. D. SMITHKEY T943,005

METHOD OF BUILDING A RADIAL TIRE

Original Filed Aug. 14, 1974